United States Patent [19]

Kovalsky et al.

[11] Patent Number: 5,415,606
[45] Date of Patent: May 16, 1995

[54] SYNCHRONOUS SHIFT COORDINATION RESPONSIVE TO AN O/D SWITCH IN AN AUTOMATIC TRANSMISSION

[75] Inventors: Mark S. Kovalsky, Novi; Patrick E. Oldani, Wixom; James J. Neigebauer, Ypsilanti; Thomas L. Greene, Plymouth; Vincent P. La Voie, Dearborn Heights, all of Mich.

[73] Assignee: Ford Motor Company, Dearborn, Mich.

[21] Appl. No.: 85,803

[22] Filed: Jul. 6, 1993

[51] Int. Cl.$^6$ .................... B60K 41/06; F16H 45/02
[52] U.S. Cl. ................................... 477/148; 477/155; 477/156
[58] Field of Search ............ 477/148, 154, 155, 156, 477/158, 149, 159, 160

[56] References Cited

U.S. PATENT DOCUMENTS

| | | | |
|---|---|---|---|
| 3,277,744 | 10/1966 | Stockton | 475/59 |
| 4,224,837 | 9/1980 | Croswhite | 475/56 |
| 4,637,281 | 1/1987 | Vanselous | 477/132 |
| 4,665,770 | 5/1987 | Vanselous | 477/175 |
| 4,671,139 | 6/1987 | Downs et al. | 477/154 |
| 4,757,886 | 7/1988 | Brown et al. | 477/176 |
| 4,934,216 | 6/1990 | Sandel et al. | 475/59 |
| 4,978,328 | 12/1990 | Pierce | 475/66 |
| 5,029,087 | 7/1991 | Cowan et al. | 364/424.1 |
| 5,046,178 | 9/1991 | Hibner et al. | 364/424.1 |
| 5,081,886 | 1/1992 | Person et al. | 477/131 |
| 5,083,481 | 1/1992 | Smith et al. | 477/906 |
| 5,086,670 | 2/1992 | Nitz et al. | 477/154 |
| 5,303,616 | 4/1994 | Palensky et al. | 477/176 |

OTHER PUBLICATIONS

U.S.S.N. 927,046 Filed Aug. 10, 1992, entitled "Electronically Controlled Bypass Clutch for a Torque Converter Transmission".

Primary Examiner—Dirk Wright
Assistant Examiner—Khoi Q. Ta
Attorney, Agent, or Firm—Frank G. McKenzie; Roger L. May

[57] ABSTRACT

An electrohydraulic control system for an automatic transmission includes planetary gearsets, clutch and brakes that control the condition of the gear components, hydraulically actuated solenoid control valves, electronic sensors connected to a microprocessor, a gear selector mechanism and an overdrive cancel switch. The extent to which a gear ratio change is completed, as represented by the ratio of the current operating gear ratio and the gear ratio associated with gear ratio at the completion of the gear shift, is used as a variable in algorithms executed by the microprocessor to schedule change in state of solenoid operated valve. The state determines the engaged and disengaged condition of friction elements that produce the gear shift.

5 Claims, 5 Drawing Sheets

| GEAR | CT1 | CT2 | CT3 | CT4 | B1 | B2 | DRIVE | | COAST | | RATIO |
|---|---|---|---|---|---|---|---|---|---|---|---|
| | | | | | | | OWC1 | OWC2 | OWC1 | OWC2 | |
| 1M | X | | X | | | X | X | | | X | 2.779 |
| 1D | X | | | | | X | X | | O/R | | 2.779 |
| 2 | X | X | | | | X | O/R | | O/R | | 1.512 |
| 3 | * | X | X | | | | | X | X | | 1.000 |
| 4 | | X | X | X | | | | O/R | | O/R | .712 |
| R | X | | X | | X | | | | | | 2.474 |

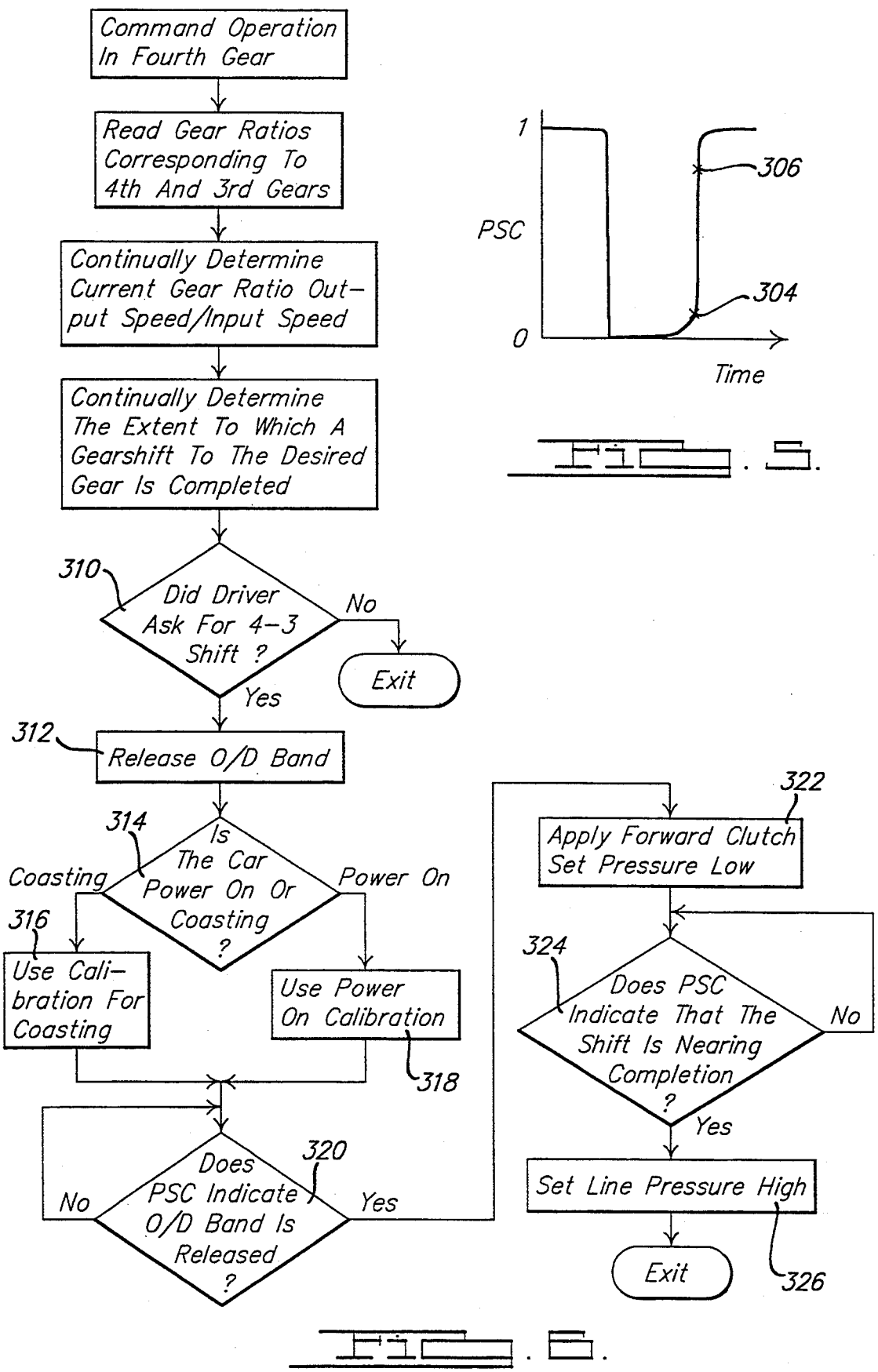

SYNCHRONOUS SHIFT COORDINATION RESPONSIVE TO AN O/D SWITCH IN AN AUTOMATIC TRANSMISSION

BACKGROUND OF THE INVENTION

1. Field of the Invention

This invention relates to the field of control and actuation of automatic transmissions for automotive vehicles. More particularly, the invention pertains to a system for controlling synchronous engagement and disengagement of friction elements that control operation of a multiple-speed transmission.

2. Description of the Prior Art

When gear ratio changes are produced in an automatic transmission, one friction element, a clutch, brake or brake band, is disengaged and a second friction element changes from the disengaged state to the engaged state. The speed ratio produced by the transmission is changed, and the torque transmitted by the various friction elements changes during the gear ratio change. To avoid harsh gear ratio changes during synchronous gear shifts various techniques are used to apply torque slowly to the oncoming friction element and to coordinate its engagement with disengagement of the offgoing friction element.

Attempts have been made to use electric timers to assure that the state of the oncoming and offgoing friction elements are coordinated in time and do not occur concurrently. However, the use of timers has produced unsatisfactory results because of the effect of temperature variations, manufacturing tolerances and differences from car line-to-car line, even where the same powertrain is employed.

In an electronically controlled automatic transmission operating in overdrive, a downshift from the overdrive speed ratio to an direct drive speed ratio occurs when the vehicle operator depresses an overdrive cancel switch, thereby producing an electronic signal but without effecting a change of position of any component of the hydraulic control circuit. Formerly such gear ratio changes required the operator to move a gearshift lever from the overdrive position to the direct drive position, thereby changing the position of a manual valve in the hydraulic control system. The downshift produces enhanced engine braking.

These problems are particularly important in automatic transmission wherein an overdrive brake band must release its engagement of an overdrive brake drum before a forward clutch is applied in order to produce a 4–3 downshift. If the forward clutch is applied before the overdrive drum is released, the output shafts of the transmission are locked to the transmission case. This action stops rotation of the drive wheels, an entirely unacceptable outcome. Furthermore, if the forward clutch is applied long after the overdrive drum is released, there will result a period during which there is no available engine braking. This latter condition is entirely unacceptable also because a desire for increased engine braking that causes the vehicle operator to downshift from the overdrive speed ratio.

SUMMARY OF THE INVENTION

It is an object of this invention to provide a method for controlling an automatic transmission that coordinates the shifting elements of the transmission gearset, clutch and brake band to properly synchronize the shifting elements and with pressure control to produce consistent timing of the shifting elements without noise vibration and harshness. The invention uses real-time measured transmission gear ratio to detect when the overdrive brake drum begins to rotate. Detection of the onset of brake drum release permits precise coordination of the offgoing overdrive brake band and the oncoming forward clutch. Electronic pressure control is also synchronized with the ratio change to improve shift quality.

In realizing these objectives the control method of the present invention continually determines whether the vehicle operator has manually commanded a downshift from an overdrive speed ratio and continually determines the current operating gear ratio produced by the transmission. The control continually determines, from the current gear ratio and the gear ratio that will be produced at the completion of the commanded gear ratio change, the extent to which a gear ratio change has been completed. When percent shift completion reaches a first predetermined magnitude indicating that the overdrive brake drum is released, the first, offgoing friction element is disengaged, and line pressure, supplied to the friction elements of the transmission selectively to produce the gear ratio to which the gear shift is being made, is maintained at relatively low magnitude to improve shift quality. When percent shift completion reaches a second higher predetermined magnitude, the magnitude of line pressure applied to the second, oncoming friction element increases in order to ensure that the forward clutch is fully applied.

The control includes a technique for determining whether the gearshift is a power-on or a power-off down shift, i.e., whether the vehicle operator is manipulating the accelerator pedal so as to demand greater engine speed or whether the vehicle operator has released application of the accelerator pedal. After a determination is made as to whether the downshift is a power-on or a power-off downshift, the control selects appropriate and corresponding first and second predetermined magnitudes of percent gearshift completion so that the gear ratio change is compatible with the demands made of the internal combustion engine that powers the vehicle.

BRIEF DESCRIPTION OF THE DRAWINGS

FIG. 5 is a diagram showing the variation over time of the variable present shift completed.

FIG. 6 is a diagram of the logic used in the algorithms that control operation of the solenoids shown in the system of FIG. 3.

DESCRIPTION OF THE PREFERRED EMBODIMENT

Figures 1, 2:
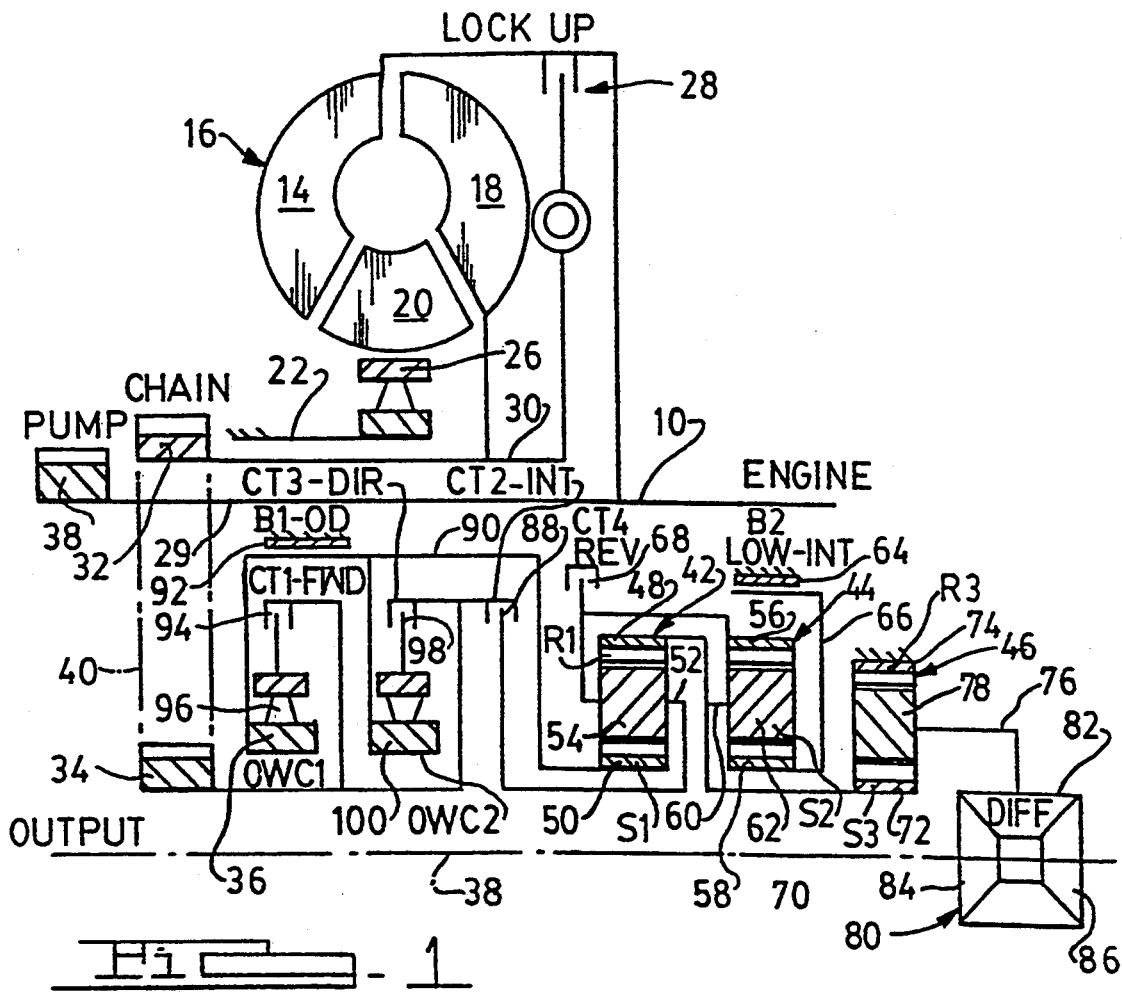
FIG. 1 shows in schematic form the friction elements and gear arrangement of a multiple-speed transaxle for an automotive vehicle driveline wherein the friction elements are control according to the present invention.
FIG. 2 is a chart that shows the clutch and the brake engagement and release pattern for the transmission schematically illustrated in FIG. 1.

In FIG. 1, numeral 10 designates the crankshaft of an internal combustion engine. Crankshaft 10 is connected to the impeller 14 of a hydrokinetic torque converter 16. The converter 16 includes also a bladed turbine 18 and a bladed stator 20, the latter being located between the torus flow outlet section of the turbine 18 and the torus flow inlet section of the impeller 14. The stator 20 is supported by a stationary sleeve shaft 22 connected to a transmission housing. An overrunning brake 26 is situated between the bladed section of the stator 20 and stationary sleeve shaft 22. Overrunning brake 26 permits freewheeling motion of the stator 20 in the direction of rotation of the impeller, but it prevents rotation in the opposite direction.

A torque converter lockup clutch 28 is adapted to establish a driving connection between the impeller 14 and turbine shaft 30, the latter being connected to the bladed impeller 18.

The engine crankshaft 10 is connected to a pump driveshaft 29, which drives a variable displacement pump 38 for the automatic transmission control system. Turbine shaft 30, which is a sleeve shaft surrounding driveshaft 29, serves as a torque input shaft for a drive sprocket 32. A driven sprocket 34 is connected to torque input shaft 36 for multiple ratio gearing disposed about the output shaft axis 38. Axis 38 is parallel and laterally offset with respect to the engine crankshaft. Drive chain 40 serves as a torque transfer member that connects drivably the drive sprocket 32 within the driven sprocket 34.

The multiple ratio gearing comprises a pair of simple planetary gear units 42 and 44 as well as a final drive planetary gear unit 46. Gear unit 42 includes ring gear 48, sun gear 50, a planetary carrier 52 and multiple planet pinions 54, which are journalled on carrier 52 so that they mesh with ring gear 48 and sun gear 50.

Carrier 52 is connected directly to ring gear 56 of the planetary gear unit 44. Gear unit 44 includes also sun gear 58, planetary carrier 60 and planet pinions 62 journalled on carrier 60 so that they mesh with ring gear 56 and sun gear Sun gear 58 is adapted to be braked by a low and intermediate brake band 64, which surrounds brake drum 66 connected to the sun gear 58. The low and intermediate brake 64 carries the notation $B_2$ in FIG. 1 as well as in the chart of FIG. 2.

A reverse brake 68 selectively brakes the ring gear 56 and the carrier 52 which are connected together as explained. Brake 68 is FIG. 1 carries the notation $CL_4$ in FIG. 1 as well as in the chart of FIG. 2.

Carrier 60 is connected to torque output shaft 70 for the planetary gearing. Shaft 70 is connected to sun gear 72 of the final drive planetary gear unit 46. Gear unit 46 includes also ring gear 74 which is held stationary by the transmission housing. Gear unit 46 includes also carrier 76 which journals pinions 78 that mesh with ring gear 74 and sun gear 72. Carrier 76 is connected to the differential carrier of a differential gear unit 80. The differential carrier has pinions 82 journalled thereon, and these are connected drivably to the carriers 76.

Differential gear unit 80 includes also side gears 84 and 86. Each side gear is connected to a separate torque output half-driveshaft, the outboard ends of the driveshafts being connected to the vehicle traction wheels. A universal joint, not shown, connects one end of each half shaft with its associated side gear and the outboard end of that half shaft is connected to its associated traction wheel by a second universal joint, not shown.

The input sleeve shaft 36 is connected to the carrier 52 of gear unit 42 through an intermediate speed ratio clutch 88. That clutch is identified by the symbol $CL_2$ in FIG. 1 as well as in the chart of FIG. 2. Sun gear 50 of the gear unit 42 is connected to brake drum 90, about which is positioned overdrive brake band 92. Brake band 92 is identified by the symbol $B_1$ in FIG. 1 as well as in the chart of FIG. 2. Sun gear 50 and brake drum 90, to which it is connected, is connected to input shaft 36 through forward clutch 94 and overrunning clutch 96 situated in series relationship. Clutch 94 is identified by the symbol $CL_1$ in FIG. 1 as well as in the chart of FIG. 2. The overrunning clutch 96 is identified by the symbol $OWC_1$ in FIG. 1 as well as in the chart of FIG. 2.

A direct drive clutch 98 and a second overrunning clutch 100, which are arranged in series relationship, connect input shaft 36 with the brake drum 90 and the sun gear 50. The symbol $CL_3$ identifies the direct drive clutch in FIG. 1 as well as in the chart of FIG. 2. A second overrunning clutch is identified by the symbol $OWC_2$ in FIG. 1 as well as in the chart of FIG. 2.

By engaging selectively the clutches and the brakes, four forward driving speed ratios can be achieved as well as a single reverse speed ratio. The forward clutch 94 is engaged during operation in the first two forward driving ratios when the gear selector is in the OD, 1M and 2M ranges, and in the third forward speed ratio provided the gear selector is in the 3M range. However, clutch 94 is disengaged in the third speed ratio when the gear selector is in the OD range. The intermediate clutch 88 is engaged in all the second, third and fourth forward driving ratios. Direct drive clutch 98 is engaged during operation in the third and fourth forward driving ratios. It is engaged also during manual low (M1) operation to effect a bypass around the overrunning clutch 100 during engine braking.

Sun gear 50 acts as a reaction member during overdrive operation. It is braked by overdrive brake band 92 which is applied during fourth ratio operation. Low and intermediate $B_2$ brake brand 64 is applied during operation in the first and second speed ratios.

Power-on and power-off downshifts from fourth speed to third speed result by disengaging OD brake band 92 and engaging forward clutch 94 while maintaining intermediate clutch 88 and direct clutch 98 engaged.

In the chart of FIG. 2, the clutch engagement and release pattern is indicated. A symbol "X" is used to define an engaged clutch or brake. The symbol O/R is used to indicate an overrunning condition for the appropriate overrunning clutch.

Figure 4A:
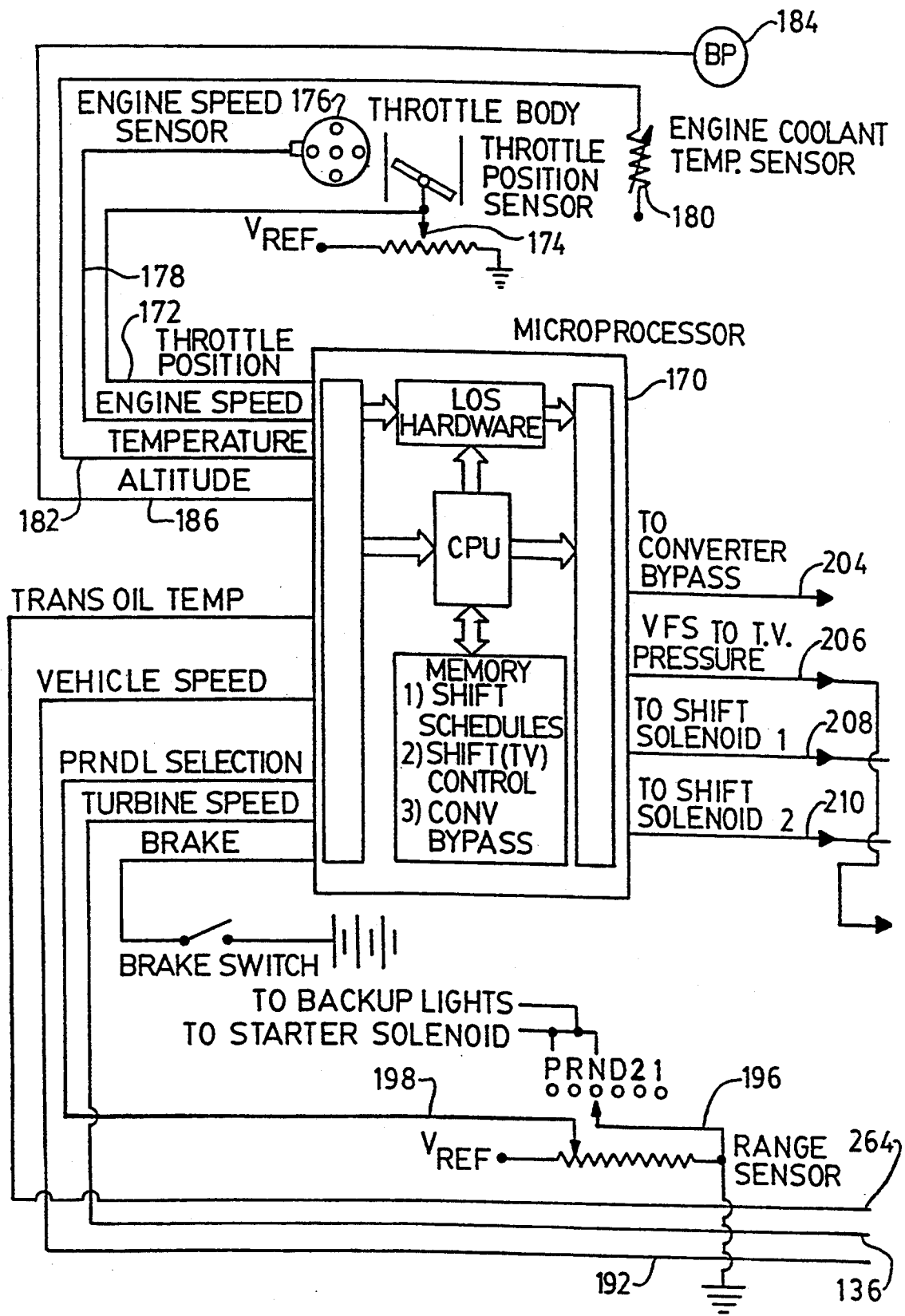
FIG. 4A and 4B show in schematic form the control elements of the bypass clutch control including the microprocessor, hydraulic valve body, planetary gearing, and various sensors that develop signals used by the processor.

FIG. 4A shows in schematic form the architecture of an electronic microprocessor 170 as well as the relationship of the processor to the hydraulic control valve body and transmission clutches and brakes. FIG. 4A shows the schematic arrangement of various sensors with respect to the processor and the hydraulic control valve body.

The sensors, together with transducers not specifically illustrated in FIG. 4A, convert physical signals to electrical signals representing conditions of the engine, powertrain and vehicle. Physical signals include throttle position or engine manifold pressure, engine speed, vehicle speed, transmission output shaft speed, transmission gear ratio selection (PRNDL), state of the OD cancel switch, engine temperature, and vehicle brake state. The processor inputs these signals and operates on them according to a control program and outputs the results to actuators, which function in cooperation with the hydraulic valve body to control the transmission. Processor 170 includes a central processing unit or CPU, which comprises a computation unit and control unit. An internal control bus carries signals between electronic memory and the processing unit. Other internal buses carry signals between the CPU and input conditioning signal circuits and output driver circuits that connect the digital output of the processor to analog current and voltage.

The CPU executes programs that are recalled from memory and executed to produce output signals applied to the hydraulic control valve body of the transmission.

The memory contains algorithms, variables, look-up tables, scalers, and new data produced by the sensors during vehicle operation.

Read-only-memory or ROM, which stores information or data, is read by the processor in each background loop. Random access memory or RAM holds or temporarily stores the results of the computations of the CPU as well as other data. The contents of RAM can be erased or rewritten.

One of the input signals to processor 170 is a throttle position signal in line 172, which is received by a position sensor 174. An engine speed sensor 176 in the form of a profile and ignition pickup (PIP) delivers an engine speed signal through line 178 to the processor 170. An engine coolant sensor 180 delivers an engine temperature signal through line 182 to the processor 170.

A vehicle speed sensor 190 produces an electronic signal representing the speed of the driven element of the transmission which is an indicator of the vehicle speed. That signal 192 is delivered through a line to the processor 170.

The drive range for the transmission is selected by the vehicle operator by manual adjustment of an adjustment lever schematically shown at 196. The various ranges are reverse, neutral, drive (D), M1, M2, OD, and OD cancel, a range produced by when the operator depresses an OD cancel switch. Various shift patterns are established for the three forward drive ranges (PRNDL), depending on the position of the gear selector that is selected by the vehicle operator. A signal 198, representing the position that is selected, is produced by the PRNDL and OD cancel switch, and is delivered through a line to the microprocessor 170.

The microprocessor 170 includes also a subsystem identified as loss-of-signal-hardware (LOS). This hardware is adapted to establish an appropriate control signal for the output driver circuit that will cause the hydraulic valve body to continue operating with limited function in the event of an electronic voltage failure in the system.

Figure 4B:
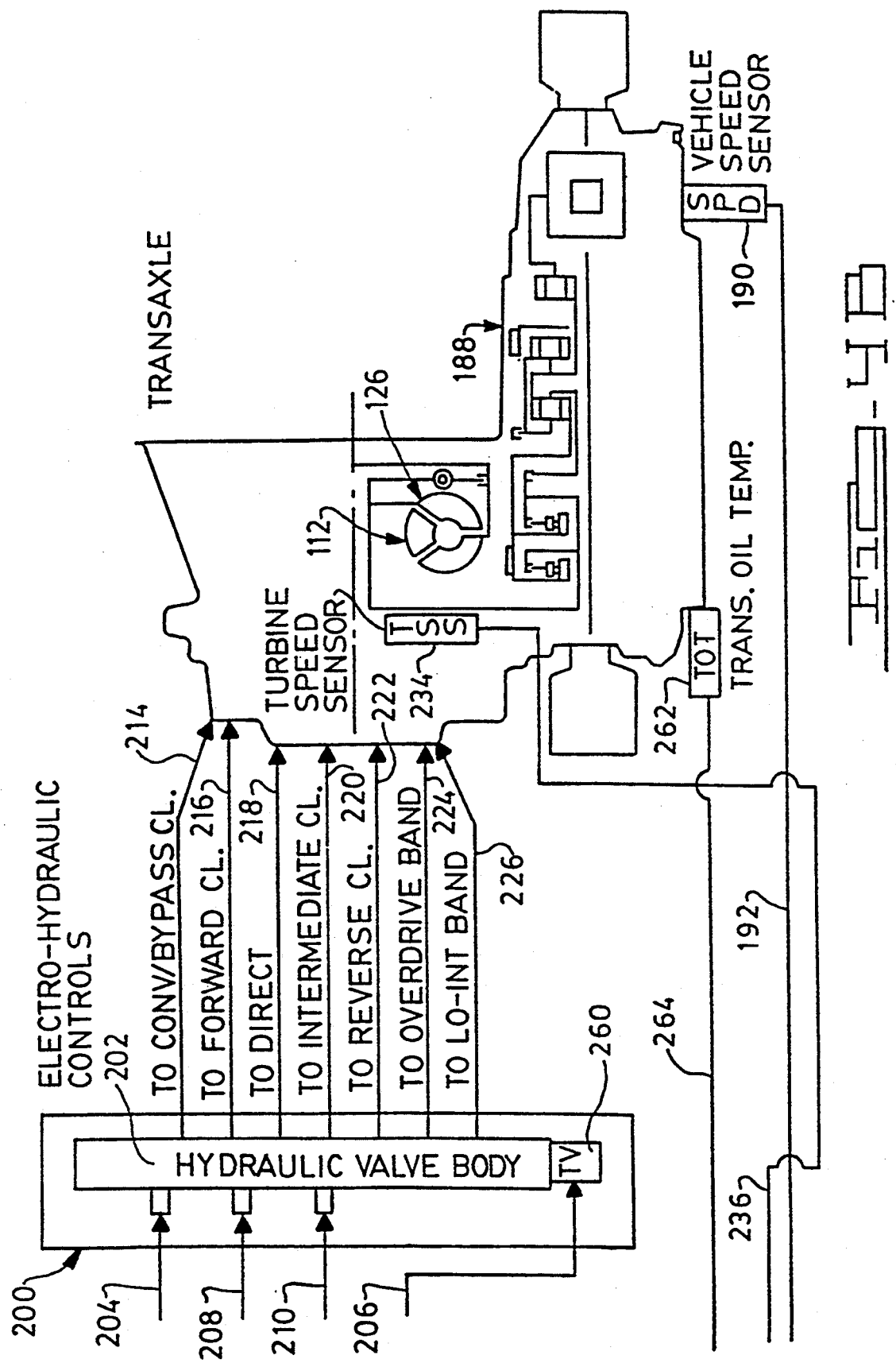

The electrohydraulic control valves, identified in FIG. 4B generally by reference character 200, include a valve body 202. The output signals 204–210 produced by the processor 170 are delivered to the control valve body through a plurality of leads. Signal 204 is a converter bypass pulse width modulated signal applied to a solenoid, which operates a valve that supplies pressure to converter bypass clutch 28. Signal 206 is a control signal for a variable force solenoid pressure control. That signal depends upon throttle position, vehicle speed, torque, oil temperature and altitude. Signals 208 and 210 are shift solenoid control pressure signals for effecting ratio changes in the transmission.

The output signals of the electrohydraulic controls 202 are distributed to the transaxle through control lines 216 through 226. Line 214 extends to a converter bypass clutch control chamber. Lines 216, 218, 220 and 22 extend, respectively, to forward clutch 94, direct clutch 98, intermediate clutch 88 and reverse clutch 68 of the transaxle. Lines 224 and 226 extend, respectively to a servo that operates overdrive brake band 92 and to a servo that operates low-intermediate brake band 64.

When the transmission is operating in a fourth speed, overdrive ratio, the OD servo 270 is pressurized so that it engages OD brake band 92, but forward clutch 94 is disengaged by venting the clutch cylinder. In the third speed ratio, due to vehicle operator depressing the OD cancel button or switch, brake band 92 is disengaged by venting OD servo 270 and forward clutch 94 is engaged by applying relatively high pressure to the clutch cylinder.

Figure 3:
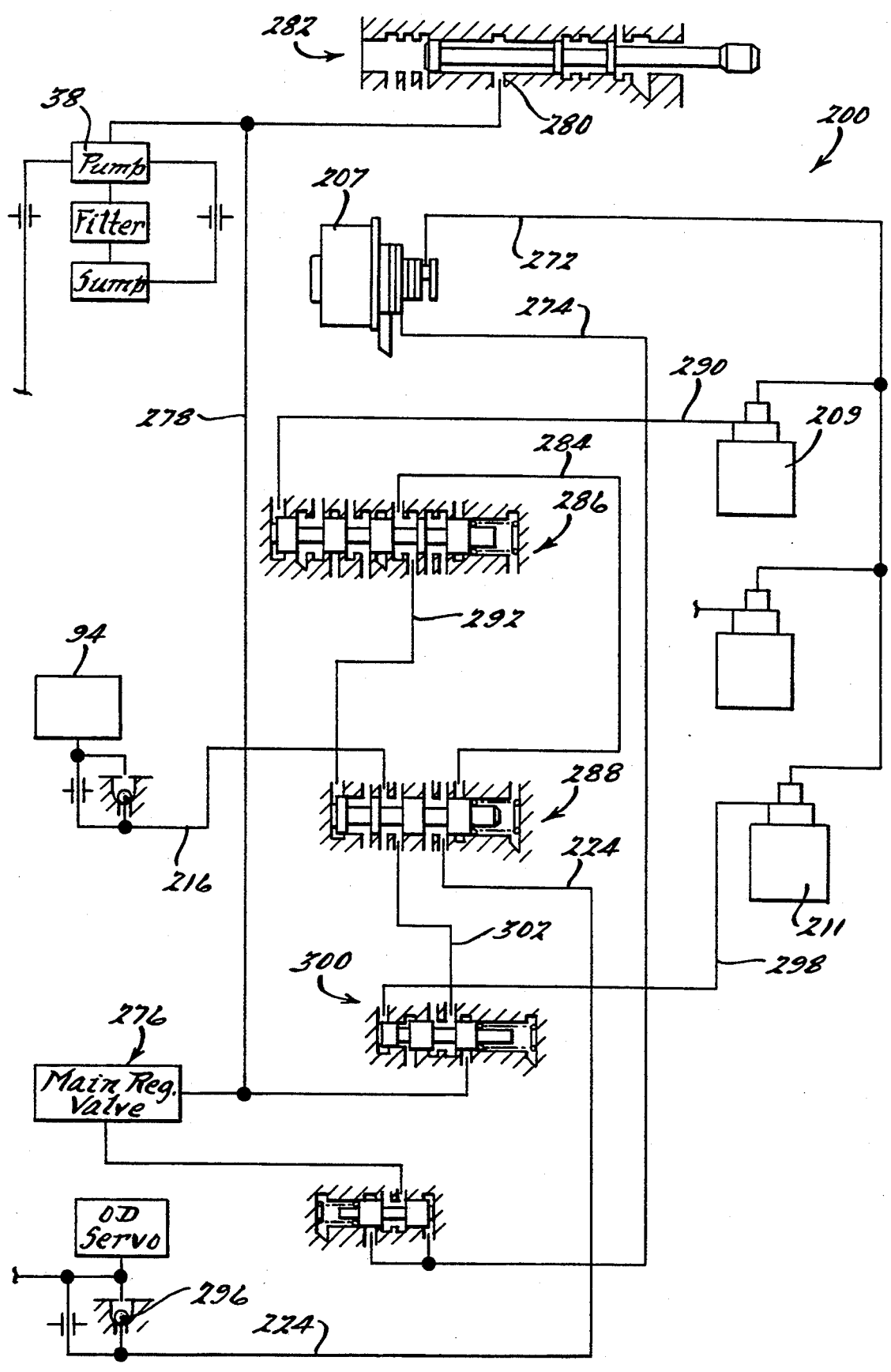
FIG. 3 is a schematic representation of the hydraulic system that controls operation of the hydraulic and mechanical components shown in FIG. 1.

The hydraulic system of FIG. 3 includes circuits that supply pressurized hydraulic fluid to the forward clutch and OD brake band in response to the control signals applied to the windings of solenoids 208 and 210.

Variable force solenoid 207 is supplied through hydraulic line 272 with regulated solenoid feed pressure, which is supplied also to solenoid control valves 209 and 211. The PWM current 206 applied to the winding of solenoid that controls valve 207 causes the output of valve 206 to vary in the range 15–92 psi. Line 274 connects the output of VSF valve 207 to main regulator valve 276, which regulates line pressure on the basis of the pressure output by valve 207. The output side of pump 38 is connected by line 278 to line pressure output by main regulator valve 276, and to port 280 of a manual valve 282. The manual valve has a spool that moves along the valve chamber in response to movement of the gear selector lever by the vehicle operator. The manual valve selectively connects line pressure to various circuits of the hydraulic system that require pressure in accordance with the position of the gear selector lever. However, when the vehicle operator changes the state of the OD cancel switch, there is no corresponding change of position of any hydraulic component caused directly by the changed state of the switch. Instead, the control algorithms executed by the microprocessor alter the condition of the hydraulic circuit by changing the state of the solenoid-operated shift valves 209 and 210 when control signals are applied to the solenoids.

To produce the fourth forward speed ratio, the solenoids that operate valves 209 and 211 are both energized but those valves produce no hydraulic flow or pressure. To produce the third forward speed ratio with the OD cancel operative, those solenoids are deenergized and valves 209 and 211 connect feed passage 272 to the output sides of the valves, lines 290, 298, respectively.

Line pressure is supplied through line 284 to 1–2 shift valve 286 and to a 3–4 shift valve 288. When valve 209 is energized, elevated control pressure is removed from line 290 from a control port at the left-hand end of shift valve 286, thereby permitting the valve spool to move leftward and to close a connection between line 284 and line 292, which is connected to a control port at the left-hand end of 3–4 shift valve 288. This action also closes a connection between line pressure in passage 284 and passage 224, which is connected through check valve 296 to OD servo 270. When servo 270 is depressurized, OD brake band 92 is disengaged and brake drum 90 and sun gear 50 are released to rotate, thereby producing the fourth gear ratio.

After the vehicle operator depresses the overdrive cancel switch, thereby commanding a downshift to the third forward speed ratio, the winding of solenoid operated valve 209 changes state from on to off. This action pressurizes line 290 so that the control pressure at the left-hand side of valve 286 moves the valve spool rightward against the effect of the control springs of that valve, thereby closing the connection between line pressure in line 284 and line 292. When control pressure is removed from the left-hand side of valve 288, the valve spool moves leftward to the position shown in FIG. 3 where line pressure in line 284 is closed to line 224 and servo 270 is depressurized. This action causes brake band 92 to disengage brake drum 90.

After the downshift to third gear is commanded, the value of percent shift completion (PSC) changes from 1 to 0 and remains at 0 as long as brake band 92 is applied. The variation of the magnitude of PSC over time during the 4-3 downshift is set out graphically in FIG. 5. When brake band 92 is fully released as a result of change of state of the windings of the valve 208 and other effects on the valves of the hydraulic system of FIG. 3 as described above, PSC rises to a first predetermined value 304 preferably in the range 0.05-0.08.

After PSC increases from 0 to the first predetermined magnitude 304, then the state of solenoid valve 211 changes from on to off. This action pressurizes line 298, through which a control pressure is applied to the left-hand side of forward clutch control valve 300 causing the spool of that valve to move rightward against the effect of the compression spring and to open a connection between line pressure in line 278 and line 302. A port of 3-4 shift valve 288 is connected by line 302 to the output port of forward clutch control valve 300 that has been opened to line pressure. When valve 209 is turned off in order to disengage brake band 92, the resulting rightward movement of the spool of 1-2 shift valve 286 against the effect of the compression spring opens line pressure in line 284 to line 292, which is applied as a control pressure to the left-hand side of 3-4 shift valve 288. That control pressure moves the spool of valve 288 rightward, thereby opening a connection between passage 302 and line 216, through which line pressure is applied to the forward clutch 94 causing engagement of clutch 94 and completion of the 4-3 gearshift.

By regulating the current applied to the winding of the variable force solenoid valve 206, the magnitude of line pressure applied to the forward clutch after PSC increases above the first predetermined value 304 is held to a relatively low magnitude to avoid harshness during the 4-3 speed ratio change. However, after PSC rises toward 1.0 due to the steady engagement of forward clutch 94, PSC reaches a second predetermined magnitude 306 (preferably in the range 0.60-0.85). EPC pressure is increased preferably to 90 psi to ensure full engagement of forward clutch 94. FIG. 5 shows that when forward clutch 94 is fully applied without slip, the magnitude of PSC again rises to 1.0 indicating that the downshift to third speed ratio is completed.

The logic embodied in the control algorithm located in electronic memory used by the microprocessor is set forth in FIG. 6. An inquiry is made at 310 to determine whether the vehicle operator has changed the state of the OD cancel switch, thereby commanding a downshift from the fourth overdrive speed ratio to the third speed ratio. If no change in state of the OD cancel switch occurs, the algorithm causes the control to exit the subroutine, which is executed on the next background pass provided statement 310 becomes true.

When statement 310 is true, control passes to statement 312, which produces a control signal output 208 to the winding of solenoid operated valve 209, thereby changing its state from on to off and producing the changes to the hydraulic circuit and brake band 92 described above. An inquiry is made at statement 314 to determine whether, on the basis of engine speed, throttle position, inlet manifold pressure, and other conditions, the vehicle is operating in a power-on or power-off condition. Depending upon the outcome of this inquiry 314, the first and second calibrated, predetermined values 304,306 stored in electronic memory corresponding to the variable PSC are selected at statements 316 and 318 on the basis of whether a power-on or power-off condition is present. Thereafter, control passes to statement 320 in order to determine whether OD brake band 92 is fully released by comparing PSC to 0. This inquiry is repetitively executed until it becomes true whereafter control passes to statement 322 where signal 210 from the microprocessor causes the state of solenoid operated valve 211 to change from on to off.

Then an inquiry is made at statement 324 to determine whether the magnitude of PSC indicates that the shift is nearing completion as indicated by the magnitude of PSC first reaching the first predetermined magnitude and thereafter the second predetermined magnitude. Magnitude of EPC pressure is controlled at statement 326 first to a relatively low magnitude and thereafter at a higher magnitude in accordance with the value of PSC by output signal 206 produced by the microprocessor and applied to the winding of VFS valve 207.

We claim:

1. A method for controlling operation during a manually selected gearshift of a multiple-gear ratio automatic transmission having first and second friction elements whose engaged, disengaged and partially engaged states determine the gear ratio produced by the transmission, resulting from the magnitude of hydraulic pressure applied thereto, comprising the steps of:

producing a first gear ratio by applying pressure to the first friction element;

determining the current gear ratio produced by the transmission and the gear ratio to be produced at the completion of a gear ratio change;

repetitively determining, from the current gear ratio and the gear ratio to be produced at the completion of a gear ratio change, the extent to which a gear change has been completed reducing pressure applied to the first friction element and allowing the first friction element to disengage in response to manual selection of a second gear;

manually initiating a gear ratio change to the second gear ratio;

pressurizing the second friction element when the extent to which a gear change to the second gear from the first gear reaches a first magnitude; and producing a second gear ratio by increasing pressure in the second friction element after the extent to which a gear change has been completed increases to a second predetermined magnitude.

2. A method for controlling operation of a multiple-gear automatic transmission with the aid of an electronic microprocessor, the transmission having first and second friction elements whose engaged, disengaged and partially engaged states determine the gear ratio produced by the transmission, comprising the steps of:

producing a first gear ratio by applying pressure to the first friction element;

repetitively determining the current gear ratio produced by the transmission;

manually commanding a gear ratio change by changing the state of an overdrive cancel switch;

repetitively determining the gear ratio produced by the transmission at the completion of the gear ratio change;

repetitively calculating a PSC ratio of the current gear ratio and the gear ratio to be produced at the completion of said gear ratio change, said PSC ratio representing the extent to which said gear change has been completed;

producing in response to the change of state of the overdrive cancel switch a first signal that changes the state of a first solenoid-operated valve and decreases pressure applied to the first friction element; and producing when said PSC ratio increases to a first predetermined magnitude a second signal that changes the state of a second solenoid-operated valve and increases pressure applied to the second friction element.

3. The method of claim 2 further comprising:

producing a third signal that changes the state of a third solenoid-operated valve, thereby increasing the magnitude of pressure applied to the second friction element after said PSC ratio increases from said first predetermined magnitude to a second predetermined magnitude.

4. A method for controlling operation of a multiple-gear automatic transmission with the aid of an electronic microprocessor and electronic memory accessible to the microprocessor, the transmission having first and second friction elements whose engaged, disengaged and partially engaged states determine the gear ratio produced by the transmission, comprising the steps of:

producing a first gear ratio by applying pressure to the first friction element;

repetitively determining the current gear ratio produced by the transmission;

manually commanding a gear ratio change by changing the state of an overdrive cancel switch;

storing in memory the gear ratio produced by the transmission that corresponds to the gear ratio produced at completion of the gear ratio change;

repetitively determining the gear ratio produced by the transmission at completion of the gear ratio change;

repetitively calculating a PSC ratio from the current gear ratio and the gear ratio to be produced at the completion of said gear ratio change, said PSC ratio representing the extent to which said gear change has been completed;

changing in response to the change of state of the overdrive cancel switch the state of a first solenoid-operated valve and decreasing pressure applied to the first friction element; and changing the state of a second solenoid-operated valve and increasing pressure applied to the second friction element after said PSC ratio increases to a first predetermined magnitude.

5. The method of claim 4 further comprising:

changing the state of a third solenoid-operated valve, thereby increasing the magnitude of pressure applied to the second friction element after said PSC ratio increases from said first predetermined magnitude to a second predetermined magnitude.

* * * * *